United States Patent [19]

Otto et al.

[11] Patent Number: 4,497,400

[45] Date of Patent: Feb. 5, 1985

[54] LOAD-UNLOAD DEVICE—LIMIT OVERLOAD SENSING DEVICE

[75] Inventors: Stanislaus J. Otto, Silver Spring, Md.; Verle L. Doty, Harrison, Ohio

[73] Assignee: The United States of America as represented by the Secretary of the Navy, Washington, D.C.

[21] Appl. No.: 464,224

[22] Filed: Feb. 7, 1983

[51] Int. Cl.$^3$ .................... B65G 17/12; B65G 43/00
[52] U.S. Cl. ................................ 198/468; 198/484; 198/524; 198/634
[58] Field of Search ............ 198/464, 468, 719, 502, 198/483, 484, 796, 856, 794, 634, 637, 524; 187/98

[56]  References Cited

U.S. PATENT DOCUMENTS 3,680,685  8/1972  Halton ............................. 198/856
4,002,231  1/1976  Doty ................................ 198/796

Primary Examiner—Joseph E. Valenza
Assistant Examiner—Douglas C. Voorhees
Attorney, Agent, or Firm—Robert F. Beers; Kenneth E. Walden; Donald J. Breh

[57]  ABSTRACT

A load-unload device is disclosed for use in a vertical conveyor system having means for sensing a jam condition between a downward moving conveyor tray and an article that has failed to remove from the load-unload device. The device includes linkage means for creating an over-center locked condition automatically releasable at a preset force. A spring receives the load due to a jam and develops the force necessary to unlock the linkage and allow the platform to move to a position for relieving the overload. A limit switch opens the conveyor drive motor down circuit as the platform moves. Provision is made for presetting a limited amount of platform movement without shutting off the conveyor.

8 Claims, 8 Drawing Figures

U.S. Patent  Feb. 5, 1985  Sheet 1 of 4  4,497,400

LOAD-UNLOAD DEVICE—LIMIT OVERLOAD SENSING DEVICE

BACKGROUND OF THE INVENTION

This invention relates to the field of conveyors of the type for transferring articles between stations on trays moving vertically within a casing. More particularly, the invention relates to a conveyor load-unload device having means for sensing an overload condition due to a jam between a downward moving conveyor tray and an article that has failed to remove from the load-unload device.

The removal of an article from a downward moving conveyor shelf-like tray at the desired station along the casing is normally accomplished by placing a load-unload device having an inclined platform made up of spaced apart transfer fingers in the casing. These transfer fingers interdigitate with fingers that make up the conveyor tray. As the conveyor tray fingers pass through the platform fingers of the load-unload device, the article transfers to the platform, and either slides down the inclined platform or is manually removed. It can be seen that if the article does not completely remove itself from the casing, it will be struck by a following downward moving conveyor tray, causing a jam.

Heretofore, the sensing of an incompletely removed article, and shut-down of the conveyor, has been accomplished by installing a torque limiting sensor in the conveyor drive means. When a jam occurs, and the torque requirements increase above a predetermined load, the drive system slips to prevent overloading the system. This method is undesirable because it cannot discern the basis of the overload condition, i.e., one article jammed or more than one article jammed. If only one article is causing the jam, the torque limiting device may be set considerably higher than the single tray and article can withstand, thereby causing damage to the tray, load-unload device or article.

Another means for preventing conveyor damage due to a jam between the article and a downward moving tray is disclosed in U.S. Pat. No. 4,002,231 to Verle C. Doty, for Load Transfer Mechanism And Jam Preventing Controls For a Vertical Self Conveyor. This means includes a load-unload device having transfer fingers provided with limited pivotal movement when in the inclined unload position. The weight of the article, when transferred from the tray to the load-unload device, causes the platform to rotate and activate a time-delay control circuit that deactivates the conveyor drive motor if the article is not removed from the load-unloaded device within the delay period. While this means is satisfactory, the duty cycle on the time delay circuit is severe, since it is activated each time an article is transferred to the platform.

SUMMARY OF THE INVENTION

The primary object of the invention is to provide means for sensing a jam between an article that fails to remove from a load-unload device in a vertical conveyor and a downward moving tray.

Another object of the invention is to provide means for deactivating the conveyor when a jam is sensed.

The objects of the invention are achieved, and the shortcomings of the prior art are overcome, by providing for the positioning of the platform of a load-unload device through a spring loaded over-center linkage arrangement. The linkage moves the platform between a position for receiving articles to be removed from the conveyor and a position for relieving any overload force on the platform and includes means for stopping the conveyor. The linkage allows presetting the magnitude of the expected overload force that will be tolerated before the platform moves to the position for relieving the overload. Provision is made for presetting a limited amount of platform movement without shutting off the conveyor or moving the platform to the relief position.

DETAILED DESCRIPTION OF THE PREFERRED EMBODIMENT

Figure 1:
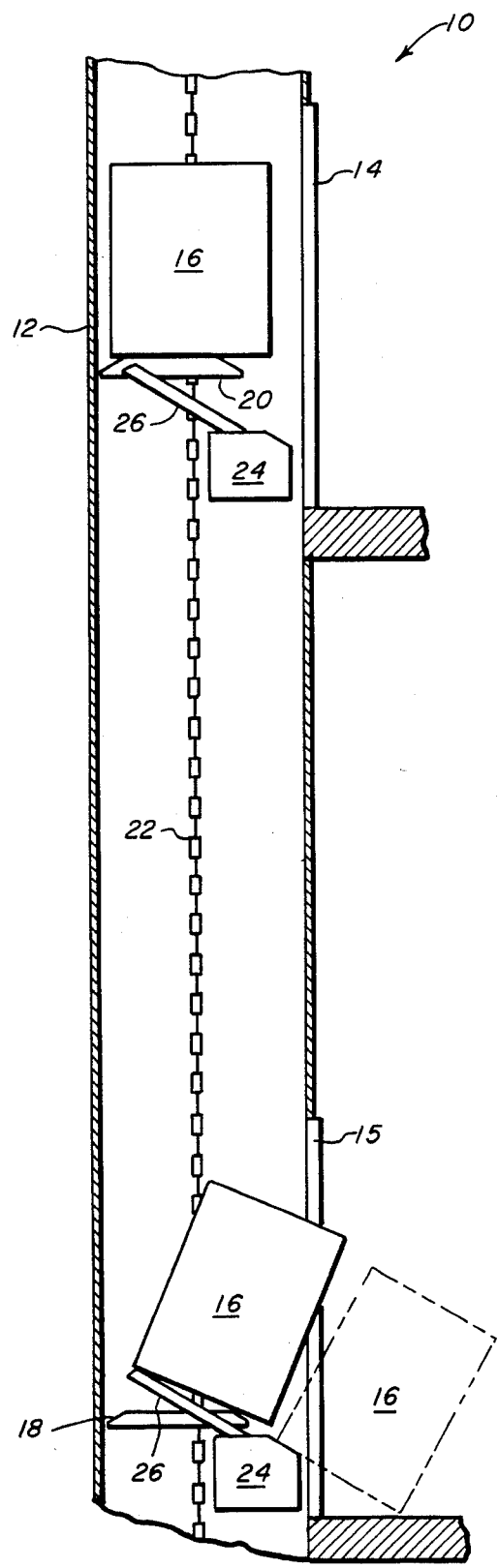
FIG. 1 is a side elevation cut away of a portion of a conveyor system showing the load-unload device in position for receiving and removing articles therefrom.

Shown in FIG. 1 is a side elevation of a portion of a vertical casing 12 having transfer openings 14, 15 at desired locations for discharging or receiving articles 16. A plurality of conveyor trays, such as 18, 20, are connected together through an endless chain 22 and traverse the casing either upwardly or downwardly as desired. Since this invention is concerned with a jam condition between article 16, which fails to remove from opening 15, and a trailing tray, such as 20, shown in FIG. 2, the conveyor will be considered to be moving downward hereinafter.

Figure 5:
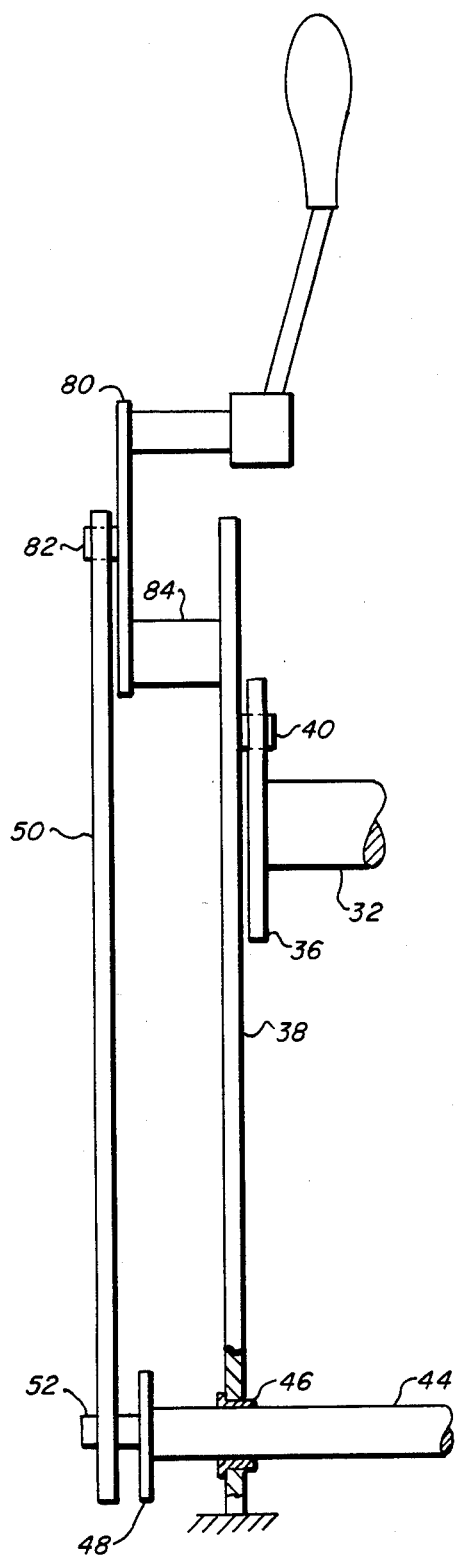
FIG. 5 is a side elevation of the left side of the preferred embodiment showing details of construction of the shifter block and platform attachment.
Figure 6:
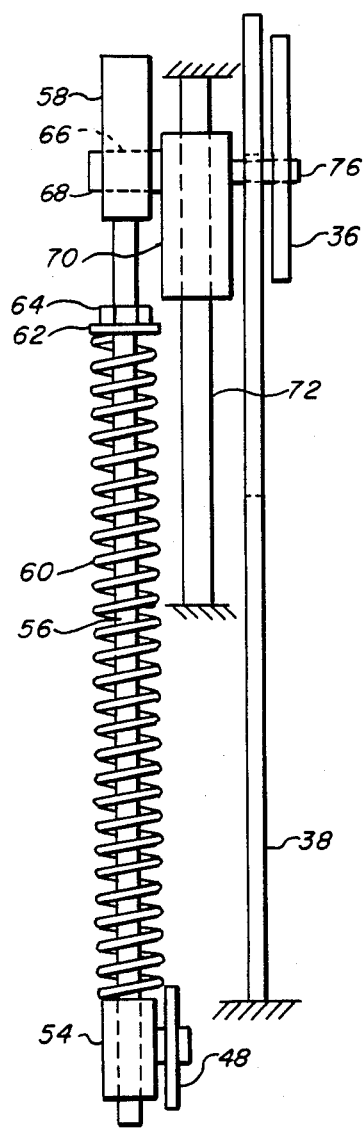
FIG. 6 is a vertical cross-sectional view along line 6—6 of FIG. 4 showing details of construction.
Figure 7:
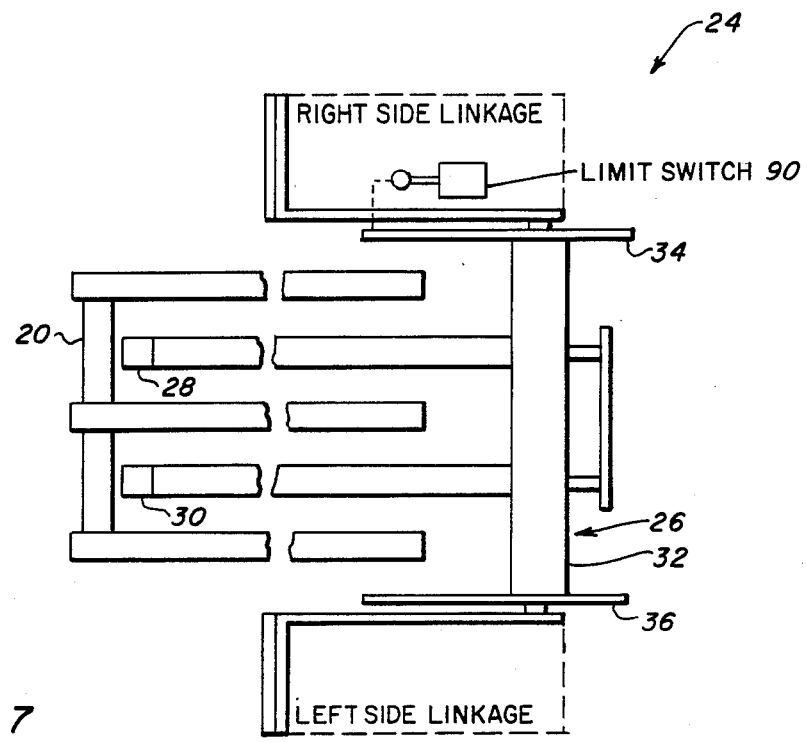
FIG. 7 is a plan view of the preferred embodiment in partial block diagram form showing location of the limit switch and the relationship of the right and left side linkage to the platform and conveyor tray.

The following description relates to the left side of the device is labeled in FIG. 7 and shown in FIGS. 3-6. The right side of the device is substantially similar to the left and differences will be set out where pertinent.

As shown in FIG. 7, unload device 24 includes a platform 26 having a plurality of fingers 28, 30 attached to a platform shaft 32. Platform shaft 32 is attached between right and left platform sides 34, 36 respectfully.

Figure 3:
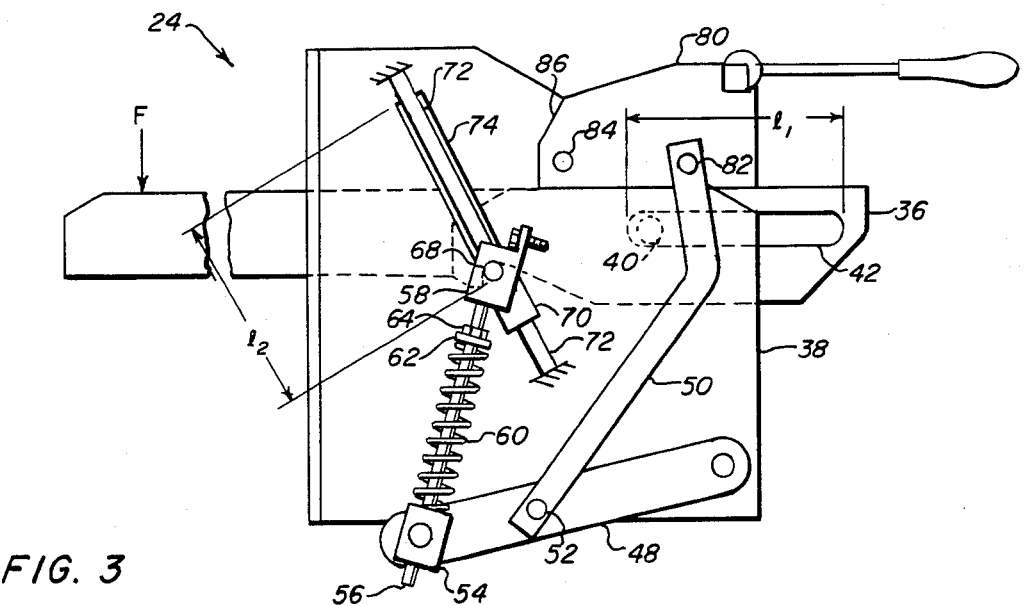
FIG. 3 is a side elevation of the preferred embodiment showing details of the invention while in the load position for relieving the overload force.
Figure 4:
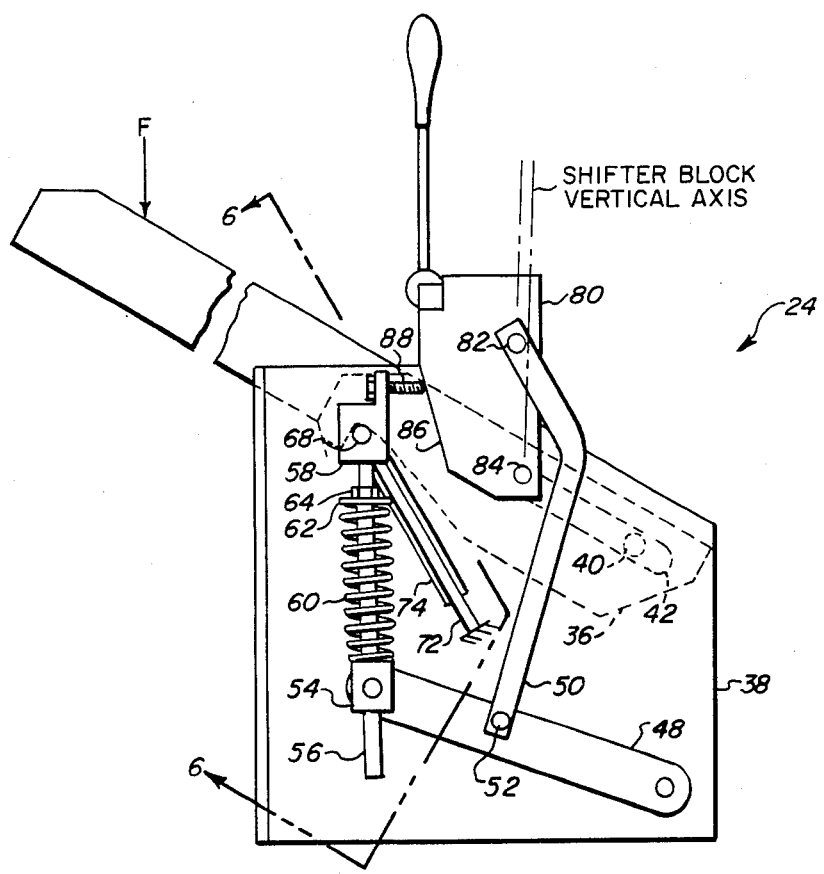
FIG. 4 is a side elevation of the preferred embodiment showing details of the invention while in the unload position for receiving articles to be removed.

Referring to FIGS. 3-5, which, as mentioned, refer to the left side of the device, platform side 36 is pivotally mounted to side bracket 38 with a pin 40 that is secured to side bracket 38. Pin 40 passes through longitudinal slot 42, of length $l_1$, in platform side 36, see FIG. 3, which allows the platform to slide linearly forward and backward along the pin. The platform can also simultaneously rotate about pin 40 as it slides. The right platform side is similarly mounted to right side bracket 34.

As shown in FIG. 5, linkage cross-shaft 44 is mounted in bushings 46 in side bracket 38 and rotates therein between a horizontal loading position, also referred to hereinafter as the position for relieving the overload force, shown in FIG. 3, and an inclined unload position, referred to hereinafter as the position or receiving articles, shown in FIG. 4. While not shown, linkage cross-shaft 44 and platform 26 are also provided to rotate to a vertical position, known as the stowed position.

As shown in FIGS. 3–5, linkage cross-shaft 44 has a clevis arm 48 attached to its outer end which rotates with the cross-shaft. A connecting arm 50 is attached to clevis arm 48 on the longitudinal axis of the clevis arm at a point 52, see FIGS. 3 and 4, intermediate the distal and proximal ends of the clevis arm. Connecting arm 50 is attached to clevis arm 48 so that it may rotate about attachment point 52 as the clevis arm rotates. Connecting arm 50 either raises or lowers depending on the direction of rotation of the clevis arm. Conversely, clevis arm 48 may be caused to rotate by raising or lowering connecting arm 50. As best shown in FIGS. 3 and 4 a clevis block 54 is attached to the distal end of clevis arm 48 so that it may also rotate about its point of attachment as the clevis arm rotates. Clevis block 54 is drilled, see FIG. 6, so that a spring rod 56 may slide therethrough. Referring to FIGS. 3, 4, and 6 a pivot block 58 is fastened to the end of spring rod 56 opposite the clevis block end. A spring 60 surrounds spring rod 56 and has one end abutting clevis block 54. Spring 60 is restrained at its other end by washer 62 and adjustment nut 64 which is threaded onto the spring rod as shown in FIG. 6. Spring 60 biases clevis arm 48 and connecting arm 50 toward the position for relieving the overload force on the platform, FIG. 3, as more fully set out hereinafter. The bias force created by spring 60 is increased by advancing nut 64 so as to increase the compression of the spring. The bias force is reduced by turning nut 64 so as to lengthen the spring, thereby reducing its compression.

As best shown in FIG. 6, pivot block 58 has a cross passage 66 for receiving a stud 68 protruding from a linear bearing assembly 70. Stud 68 is fitted and retained within the cross passage, so that the stud and bearing may pivot as spring rod 56 and pivot block 58 rise and fall. Linear bearing assembly 70 traverses a bearing shaft 72 as shown in FIG. 6. Bearing shaft 72 is secured to the device in a position that defines the path of movement of the platform between the position for receiving articles and the position for relieving any overload force on the platform as set out hereinafter.

Side bracket 38 has a slot 74, of length $l_2$, see FIG. 3, disposed angularly to the platform when in the horizontal position. As shown in FIG. 6, bearing shaft 72 is mounted parallel to side bracket 38 and slot 74 and, as shown in FIGS. 3 and 4, is mounted at the same angular relation to the platform as slot 74. The longitudinal axis of shaft 72 coincides with the longitudinal axis of slot 74, when viewed perpendicularly to the side bracket and slot, see FIGS. 3 and 4. A platform support stud 76, protrudes from linear bearing assembly 70, see FIG. 6, extends through angular slot 74, and passes under a notch 78 on the lower edge of the forward end of platform side 36, see FIG. 8. Support stud 76 thereby supports the platform and transfers any force F on the platform, see FIGS. 3 and 4, including any overload force caused by a jam condition, through the bearing assembly to the spring rod causing the spring to compress.

Support stud 76 traverses angular slot 74 as the bearing assembly traverses the bearing shaft. The platform is thereby caused to move between the position for receiving articles, see FIG. 4, and the position for relieving the overload force, see FIG. 3, over the path of movement defined by the angular position of the bearing shaft and slot 74.

Referring to FIGS. 3, 4, and 5 connecting arm 50 is pivotably attached at its upper end to a shifter block 80 through suitable means such as a pin 82. Shifter block 80 is rotably attached to side bracket 38 also through suitable means such as a pin 84. When the shifter block is rotated to move the platform to the position for receiving articles, connecting arm 50 rises causing clevis arm 48 to rotate and compress spring 60. When the spring force developed is sufficient, platform 26 moves to the position for receiving articles shown in FIG. 4. In the position for receiving articles, adjustment screw 88, best shown in FIG. 4, contacts an inclined stop and cam surface 86 on the shifter block preventing further movement of the linkage. When shifter block 80 has moved to contact screw 88, the connecting arm to shifter block point of attachment 82 is positioned counter-clockwise past the vertical axis of the shifter block attachment point 84, thereby placing the linkage in an over-center position, see FIG. 4. An over-center force that opposes the weight of the platform and any article thereon is developed, and the platform and article are thereby supported.

The over-center force developed depends on the amount of counter-clockwise rotation of the shifter block, which is determined by adjustment screw 88. It can be seen that the magnitude of the over-center force can be preset with the adjustment screw.

The force for overcoming the preset over-center force, and for causing the over-center arrangement to release, is developed by the compression of spring 60. When spring 60 compresses an amount sufficient to develop a force of a magnitude just exceeding the over-center force, the over-center linkage will release causing the platform to move to the position, which may be identified as a second position for relieving the overload force, shown in FIG. 3.

While the total amount of spring compression to develop a given force remains constant, the amount of platform movement in developing the force can be preset by presetting the initial compression of spring 60. Greater initial compression of spring 60 will yield less platform movement in compressing the spring to the position where the force is developed. Likewise, less initial compression of spring 60 yields will increase movement of the platform in compressing the spring to the position where the required force is developed. The ability to preset a limited amount of platform movement prior to overcoming the preset force gives the platform a measure of cushion, which may be desirable to absorb abnormal, momentary, impulse or shock loads on the platform, which do not require shutting down the conveyor.

Figure 8:
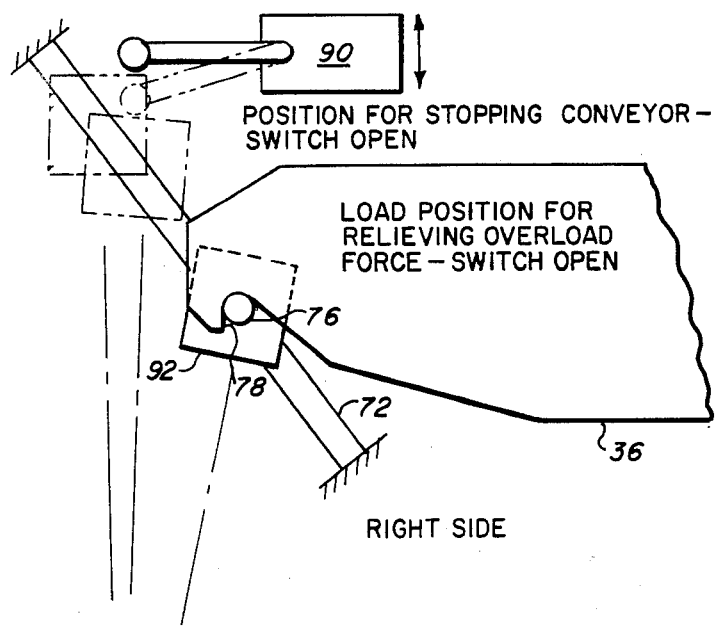
FIG. 8 is a diagrammatic representation of the right side of the preferred embodiment showing the location and operation of the limit switch.

The right side of the device is substantially the same as the left side except that it does not include the over-center linkage shifter block and connecting arm components. Additionally, as shown diagrammatically in FIGS. 7 and 8, the right side includes an electrical switch 90 mounted in the path of travel of right side pivot block 92. The right side linkage is connected to the left side, and operated by, linkage cross-shaft 44, shown best in FIG. 5. Switch 90 is a normally open switch included in the down direction electrical circuit of the conveyor drive motor. As shown in FIG. 8, the switch is held closed by pivot block 92 when the platform is in the position for receiving articles. When the platform moves due to an overload force, pivot block 92 moves away from switch 90 allowing it to return to its normally open position shutting off the conveyor motor. The position of the platform for shutting down the conveyor may be made adjustable by mounting switch 90 so as to be moveable in relation to pivot block 92, as shown by the directional arrow in FIG. 8.

PREFERRED MODE OF OPERATION

In operation, screw 88, FIG. 4, is adjusted to position the shifter block in an over-center position that developes a force equal to an expected overload force that may occur on the platform. The initial spring compression is adjusted so as to provide a predetermined amount of platform travel in developing the force for overcoming the preset over-center force. Finally, the position of switch 90 is adjusted so as to fix the position of the platform at which the conveyor shuts down.

Figure 2:
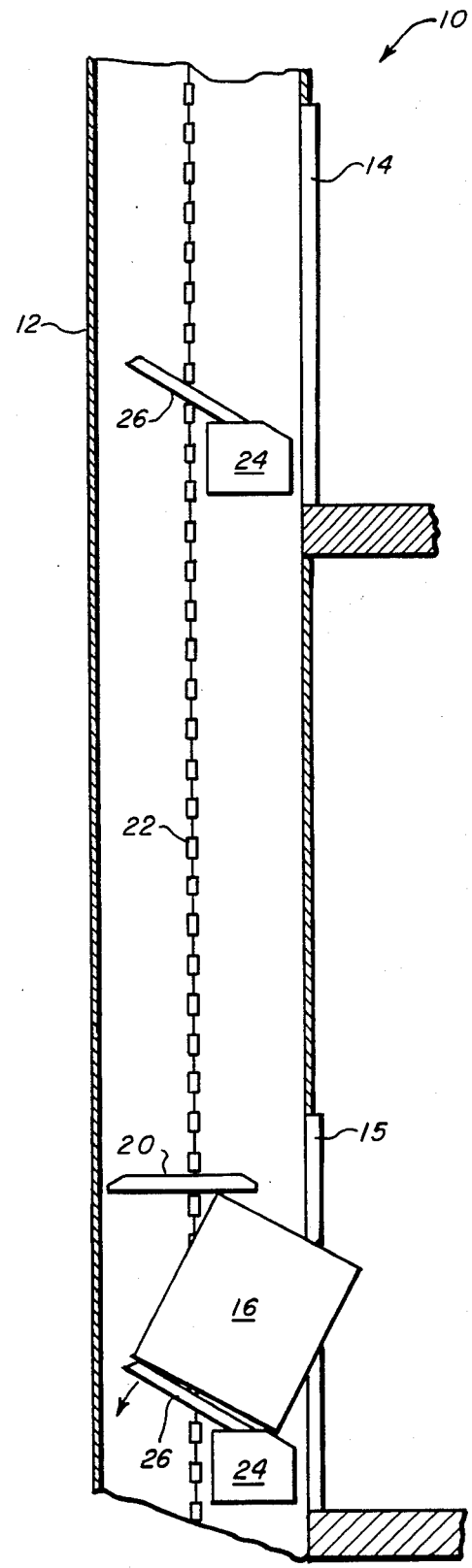
FIG. 2 is a side elevation cut away of a portion of a conveyor system showing an article that has failed to remove from the load-unload device and is thereby creating a jam condition with a subsequent downward moving tray.

When articles are to be removed from the conveyor, the load-unload device is placed within the casing at the desired transfer opening, such as 15 in FIG. 1, and the shifter block rotated to move the platform to the position for receiving the articles. Switch 90 is caused to close, as shown in FIG. 8, which allows the drive motor to operate in the down direction. Normally, downward moving articles contact the inclined platform and are removed from the casing by sliding out or by manual removal, as illustrated in FIG. 1. If an article fails to remove, and remains on the platform, a following downward moving tray will strike the article creating a jam as shown in FIG. 2. Continued downward movement of the tray begins to load the article and platform causing it to move toward the position for shutting off the conveyor, FIG. 3. Switch 90 is opened and the conveyor shuts down when pivot block 92 moves away from the switch. The overload force is transmitted to spring 60 which compresses until the over-center force is overcome, whereupon the linkage releases and the platform is adapted to be allowed to free-fall to a lower position shown in FIG. 3 for increasing the distance between the platform and the tray to allow removal of the article from the platform.

Should switch 90 shut off the conveyor prior to the spring force overcoming the over-center force, the article would remain jammed. To avoid this situation, the switch is normally adjusted to shut off the conveyor at, or just after, the platform position at which the over-center force is overcome, thereby assuring that the overload force will be relieved.

Other embodiments and modifications of the invention will readily come to the mind of one skilled in the art having the benefit of the teachings presented in the foregoing description and drawings. This invention is not limited thereto and said modifications and embodiments are to be included within the scope of the appended claims.

We claim:

1. An unload device for receiving articles from spaced apart conveyor trays on a conveyor at transfer stations and having anti-jamming features comprising:

a pivotably mounted platform defining one of the transfer stations upon which articles carried on the conveyor trays are adapted to be received for removal from the conveyor;

means associated with said platform whereby when a force exceeding a predetermined magnitude is exerted on said platform whenever the article carried thereon becomes jammed between said platform and another conveyor tray for permitting said platform to pivot in response to the force on the jammed article and free-fall to a position for increasing the spacing between said platform and said another conveyor tray for relieving the force on the jammed article; and, means responsive to pivotal movement of said platform for stopping further travel of the conveyor.

2. The device as defined in claim 1 wherein said means for permitting pivotal movement of the platform includes means for developing a preset force of a magnitude equal to the expected overload force for supporting the platform and articles until the overload force exceeds the preset force.

3. The device as defined in claim 1 further including means for presetting the amount of force on said platform necessary to cause said platform to pivot to the position for relieving the force.

4. The device as defined in claim 1 wherein said means for stopping the conveyor is adapted to allow preset limited movement of the platform prior to stopping the conveyor.

5. The device as defined in claim 2 wherein said means for developing the preset force comprises:

an over-center linkage arrangement operatively connected to the platform and adapted to move the platform between the position for receiving articles and the position for relieving the overload force, said linkage rotates to an over-center position when the platform is in the position for receiving articles developing said preset force, the magnitude of said preset force defined by the over-center position of said linkage.

6. An unload device for receiving articles from spaced apart conveyor trays on a downwardly moving conveyor at transfer stations and having anti-jamming features comprising:

a pivotably mounted platform biased to an initial position across the conveyor path and defining one of the transfer stations upon which articles carried on the conveyor trays are adapted to be received for removal from the conveyor;

means associated with said platform whereby when a force exceeding a predetermined magnitude is exerted on the platform by an article jammed thereagainst by a following conveyor tray to cause the platform to pivot against its bias from its initial position to a second position; and switch means responsive to pivotal movement of the platform for interrupting electrical power for moving the conveyor;

said means associated with the platform acting when the platform has moved to its second position to release the platform for permitting it to free-fall about its pivot to a lower position for increasing the distance between the platform and following conveyor tray, thereby allow physical removal of the article.

7. The invention according to claim 6 wherein the means associated with the platform includes an over dead-center mechanism.

8. The invention according to claim 7 wherein the over dead center mechanism is adapted to trip when the platform has been moved to its second position and allow the platform to free-fall to a lower position.

* * * * *